US010684918B2

(12) United States Patent
Narasingarayanapeta et al.

(10) Patent No.: US 10,684,918 B2
(45) Date of Patent: Jun. 16, 2020

(54) GRANULAR DUMP BACKUP RESTART

(71) Applicant: NetApp Inc., Sunnyvale, CA (US)

(72) Inventors: Krishna Murthy Chandraiah setty Narasingarayanapeta, Bangalore (IN); Vijay Srinath, Bangalore (IN); Rakesh Bhargava M R, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 972 days.

(21) Appl. No.: 15/071,282

(22) Filed: Mar. 16, 2016

(65) Prior Publication Data

US 2017/0270008 A1      Sep. 21, 2017

(51) Int. Cl.
*G06F 16/00*     (2019.01)
*G06F 11/00*     (2006.01)
*G06F 16/23*     (2019.01)
*G06F 11/14*     (2006.01)

(52) U.S. Cl.
CPC ...... *G06F 11/1451* (2013.01); *G06F 11/1469* (2013.01); *G06F 16/2358* (2019.01); *G06F 2201/82* (2013.01); *G06F 2201/86* (2013.01)

(58) Field of Classification Search
CPC ............. G06F 11/1451; G06F 11/1458; G06F 11/1469; G06F 2201/82; G06F 2201/84; G06F 2201/86; G06F 11/1453; G06F 11/1461; G06F 11/1466; G06F 16/221; G06F 16/2358; G06F 2003/0697; G06F 2201/80; G06F 2201/81; G06F 3/0601
See application file for complete search history.

(56) References Cited

U.S. PATENT DOCUMENTS

| | | | |
|---|---|---|---|
| 6,728,735 B1* | 4/2004 | Fong | G06F 11/1471 707/642 |
| 7,440,965 B1* | 10/2008 | Pruthi | G06F 11/1448 |
| 2007/0047006 A1* | 3/2007 | Sakai | G06F 3/1207 358/400 |
| 2015/0261620 A1* | 9/2015 | Ruiz | G06F 11/1458 707/649 |

* cited by examiner

Primary Examiner — Dinku W Gebresenbet
(74) Attorney, Agent, or Firm — Cooper Legal Group, LLC

(57) ABSTRACT

One or more techniques and/or computing devices are provided for restarting a dump backup. For example, a phase offset table is used to track a directory transfer phase offset and a file transfer phase offset of phases of a dump backup. An offset map is used to map inodes, of data being backed up, to offsets within a backup image within which the data is being backed up. The phase offset table and/or the offset map are evaluated using a bytes written value to identify a phase during which the dump backup aborted and to identify a restart point. Accordingly, the dump backup is restarted at the restart point. In this way, the dump backup may be restarted during any phase and/or at any point using the bytes written value, the phase offset table, and the offset map without the need for additional information such as a file history.

20 Claims, 8 Drawing Sheets

GRANULAR DUMP BACKUP RESTART

BACKGROUND

Many storage environments may implement data replication and/or other redundancy data access techniques for data loss protection and non-disruptive client access. For example, a first device, such as a storage server, may store data, such as files and/or directories, within first storage. The first device may perform a dump backup to back up the data into second storage (e.g., tape storage, a distributed storage environment such as cloud storage, or any other storage media). The dump backup may have multiple phases. During a backup data identification phase, data that is to be backed up is identified. During a metafile phase, one or more bitmaps are constructed based upon the data. The bitmaps may be locally stored within the first storage, and subsequently transferred to the second storage. During a directory transfer phase, directories are transferred from the first storage to a backup image within the second storage. During a file transfer phase, files are transferred from the first storage to the backup image.

Unfortunately, the dump backup may abort before completion for various reasons. Restarting the dump backup may be limited to merely restarting from a particular phase, which can result in redundant backup workflow because the dump backup cannot be restarted at a granularity of where the dump backup aborted (e.g., the restarted dump backup may transfer directories and/or files already transferred before the abort). Also, restartability of the dump backup may rely upon a file history being created. However, the file history may not be available.

DETAILED DESCRIPTION

Figure 1:
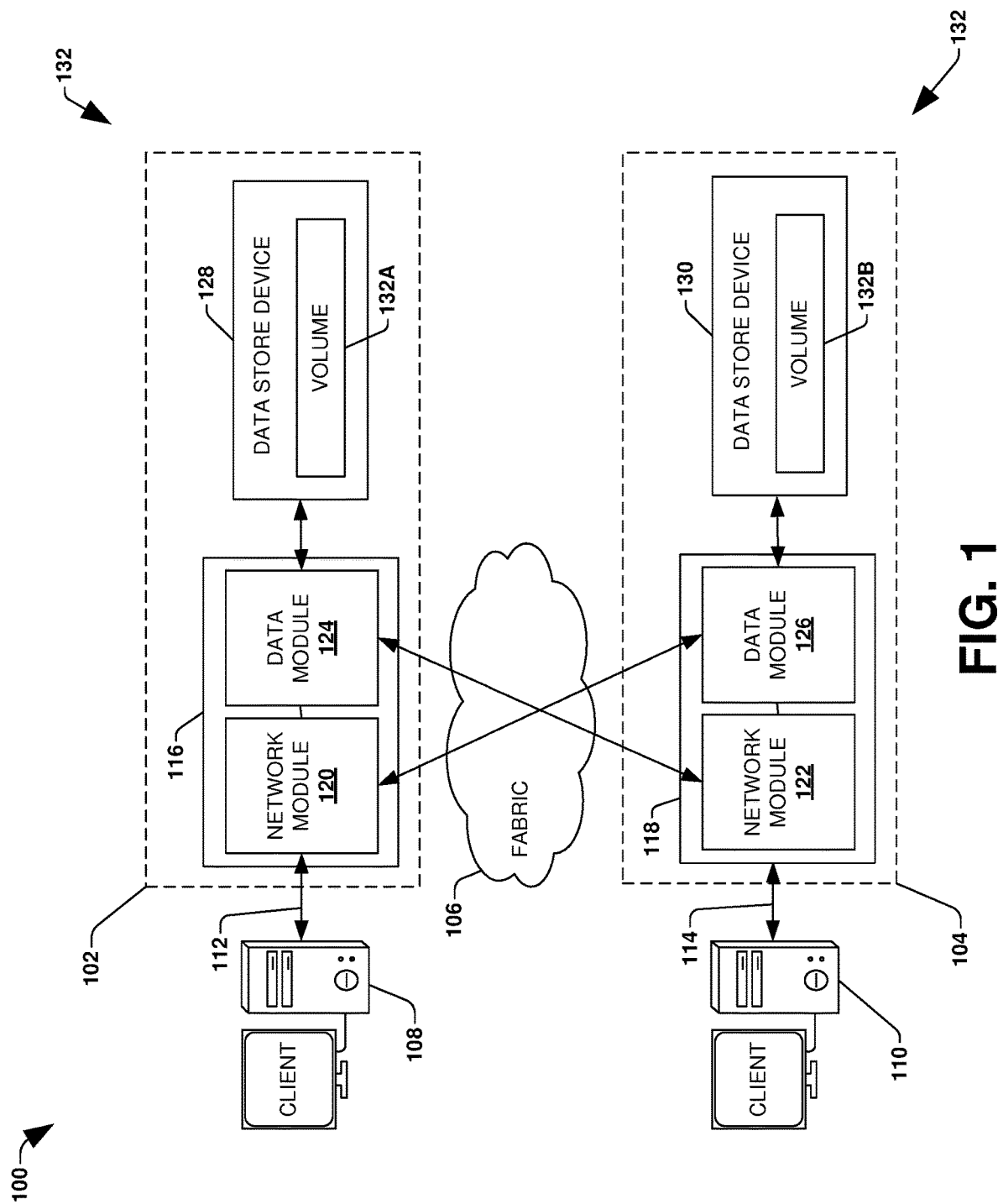
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for restarting a dump backup are provided herein. For example, a phase offset table is used to track a directory transfer phase offset of a directory transfer phase of the dump backup. The phase offset table is used to track a file transfer phase offset of a file transfer phase of the dump backup. An offset map is used to map inodes, of data being backed up, to offsets within a backup image within which the dump backup is transferring the data. The phase offset table and/or the offset map are evaluated using a bytes written value (e.g., a number of bytes transferred into the backup image before an abort of the dump backup occurred) to identify a phase of the dump backup during which the abort occurred and to identify a restart point. Accordingly, the dump backup may be restarted at the restart point. In this way, the dump backup may be restarted during any phase and/or at any point within a phase using the bytes written value, the phase offset table, and the offset map without reliance upon additional information such as a file history.

To provide context for restarting a dump backup, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network moduless 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that restarting a dump backup may be implemented within the clustered network environment 100. In an example, the node 116 (e.g., a first device) may store data within volume 132A. The node 116 may perform a dump backup to back up data of the volume 132A into a backup image within volume 132B maintained by the node 118 (e.g., a second device). If the dump backup fails, then the dump backup may be restarted at a restart point (e.g., during any phase or point within a phase during which the dump backup aborted) without reliance upon using a file history. It may be appreciated that restarting a dump backup may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
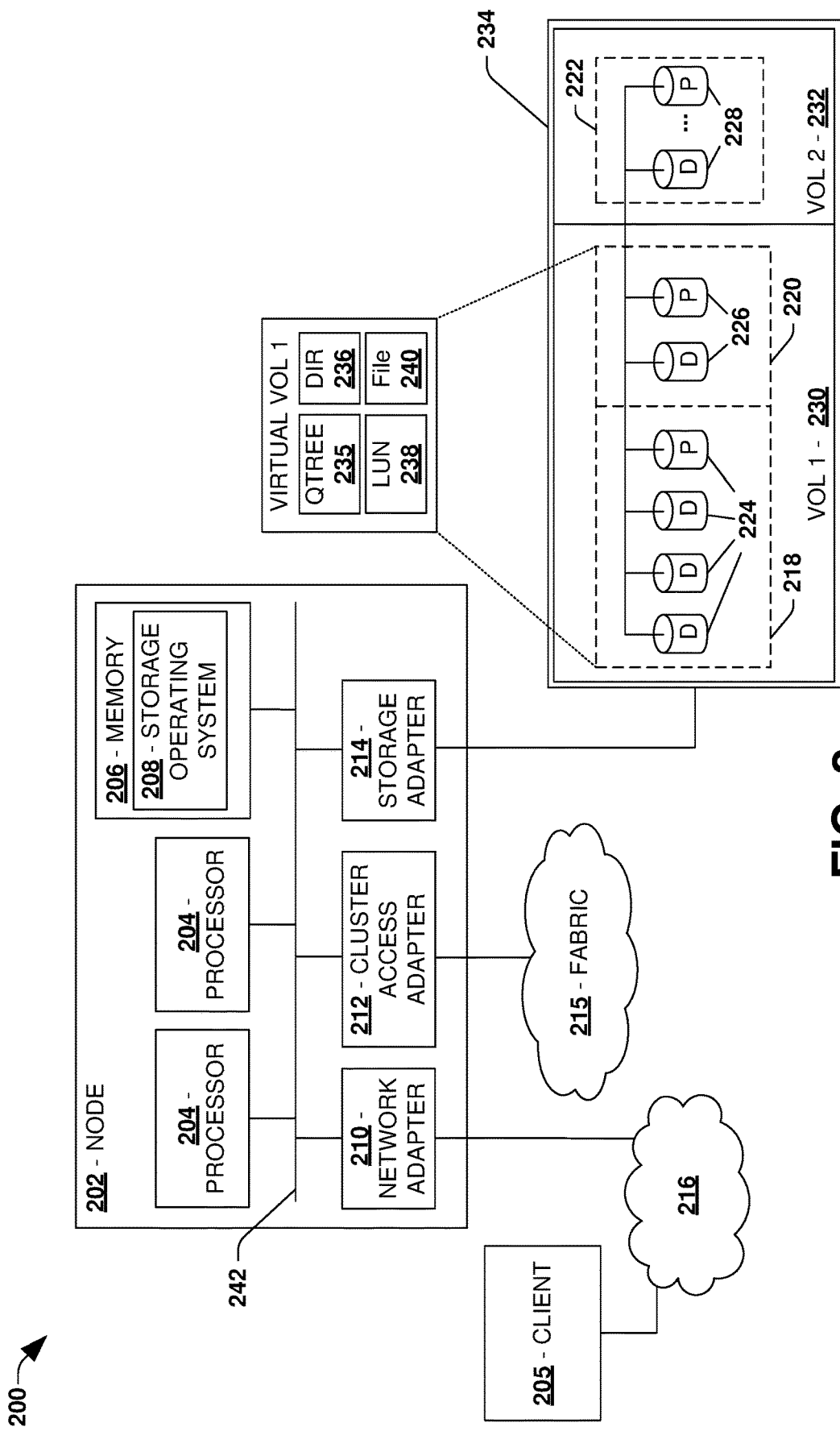
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that restarting a dump backup may be implemented for the data storage system 200. In an example, the node 202 (e.g., a first device) may store data within volume 230. The node 202 may perform a dump backup to back up data of the volume 230 into a backup image within a second volume maintained by a second node (e.g., a second device). If the dump backup fails, then the dump backup may be restarted at a restart point (e.g., during any phase or point within a phase during which the dump backup aborted) without reliance upon using a file history. It may be appreciated that restarting a dump backup may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
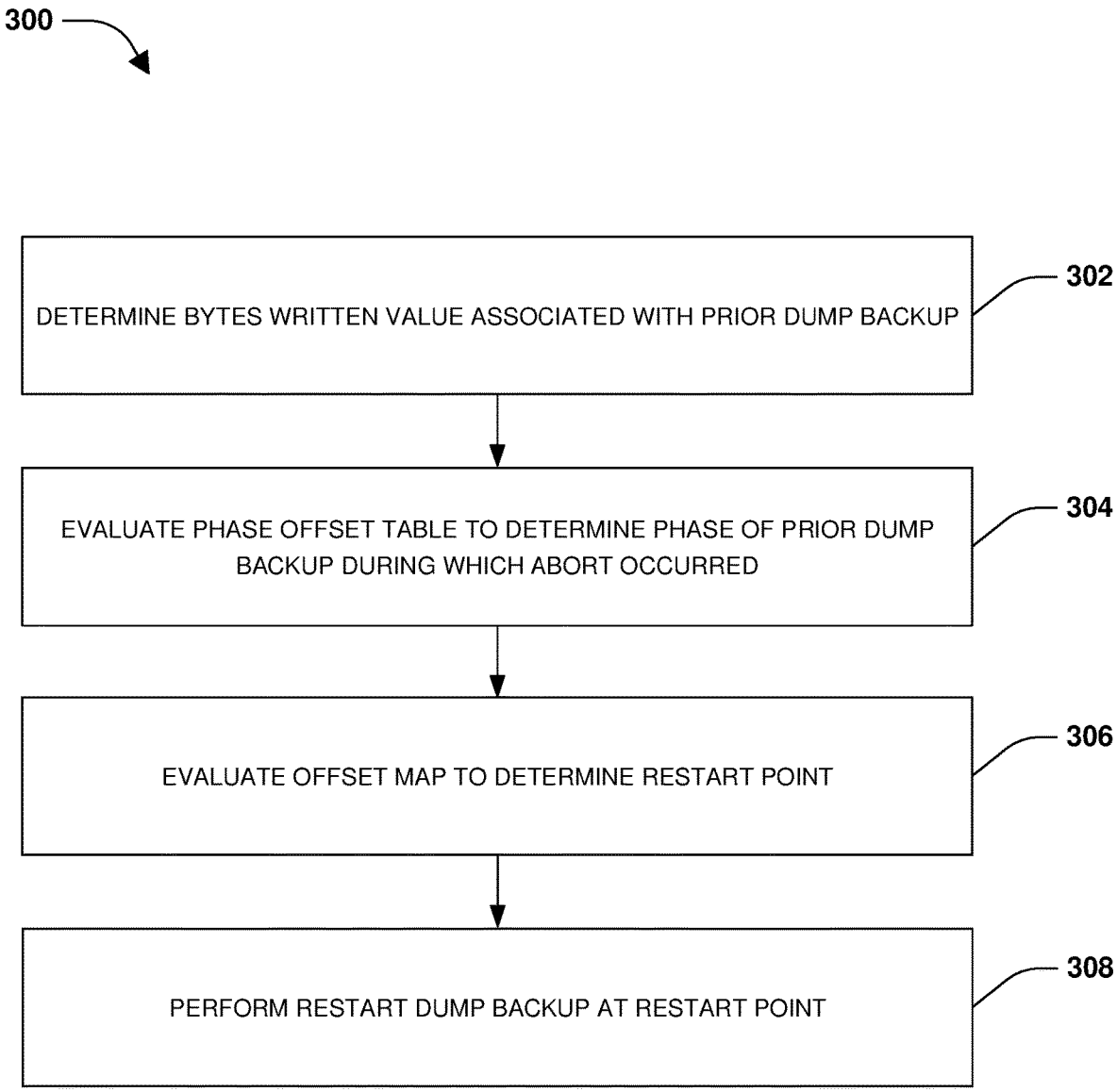
FIG. 3 is a flow chart illustrating an exemplary method of restarting a dump backup.

One embodiment of restarting a dump backup is illustrated by an exemplary method 300 of FIG. 3. A first device may store data, such as directories and/or files, within first storage. The first device may perform a dump backup to transfer the data into a backup image within second storage (e.g., a distributed storage environment such as cloud storage, a tape backup device, or any other storage media). In an example, a file history creation operation may be unavailable or turned off for the dump backup, and thus a file history may not be available for restarting the dump backup. The dump backup may have multiple phases. During a backup data identification phase, the data that is to be backed up is identified for backup. During a metafile phase, one or more bitmaps, such as a first bitmap and a second bitmap, are constructed based upon the data. The bitmaps may be locally stored within the first storage, and subsequently transferred to the second storage. During a directory transfer phase, directories are transferred from the first storage into the backup image within the second storage. During a file transfer phase, files are transferred from the first storage to the backup image. In an example, the phases may be performed in a sequential order such as performance of the backup data identification phase, the metafile phase, the directory transfer phase, and then the file transfer phase.

During the dump backup, a phase offset table and/or an offset bitmap may be maintained. The phase offset table comprises a directory transfer phase offset of the directory transfer phase. When a byte of a directory is written to the second storage (e.g., an initial byte of an initial directory that is being backed up), the directory transfer phase offset may be updated or set based upon the byte. The phase offset table comprises a file transfer phase offset of the file transfer phase. When a byte of a file is written to the second storage (e.g., an initial byte of an initial file that is being backed up), the file transfer phase offset may be updated or set based upon the byte. The offset bitmap may comprise entries that map inodes of the data being backed up to offsets within the backup image (e.g., offsets at which the data is being backed up). In an example, the offset map may comprise an entry mapping a file inode of a file, comprised within the data of the first storage, to an offset of a backup location for the file within the backup image of the second storage. In another example, the offset map may comprise an entry mapping a directory inode of a directory, comprised within the data of the first storage, to an offset of a backup location for the directory within the backup image of the second storage. In another example, the offset map may be populated with a first entry mapping the first bitmap to a zero offset and a second entry mapping the second bitmap to a first offset. The first bitmap may have a first reserved inode number and the second bitmap may have a second reserved inode number in order to avoid collisions with inodes of files and/or directories being backed up. In an example, a bytes written value associated with a number of bytes written to the back image may be maintained (e.g., provided to a client that requested performance of the dump backup).

In an example, the dump backup may abort before completing. At 302, the bytes written value may be determined (e.g., the client may provide the bytes written value to the first device for determining how to restart the dump backup). At 304, the phase offset table may be evaluated using the bytes written value to determine a phase of the dump backup during which the abort occurred. In an example, responsive to the bytes written value having a zero value, the dump backup may be determined as being aborted during the backup data identification phase. In another example, responsive to the bytes written value being greater than zero and the directory transfer phase offset having a zero value (e.g., at least some of the bitmaps were transferred to the second storage but no directories or files were transferred), the dump backup may be determined as being aborted during the metafile phase. In another example, responsive to the directory transfer phase offset being greater than zero and the bytes written value being less than a value of the file transfer phase offset (e.g., at least some directory data has been transferred but no files because files are transferred after directories), the dump backup may be determined as being aborted during the directory transfer phase. In another example, responsive to the bytes written value being greater than the value of the file transfer phase offset (e.g., at least some file data has been transferred), the dump backup may be determined as being aborted during the file transfer phase.

At 306, the offset map may be evaluated using the bytes written value and/or the phase to determine a restart point. In an example, the restart point may be determined as a beginning point based upon the dump backup aborting within the backup data identification phase. In another example, the offset map may be queried using the bytes written value to identify an inode (e.g., of a directory or file being backed up) as the restart point based upon the inode having a value that is smaller than and closest to the bytes written value. The restart point may be determined as a subsequent byte to a difference between the bytes written value and an offset of the inode. At 308, a restart dump backup, of the dump backup, may be performed at the restart point. For example, the restart dump backup may be restarted at a file or directory granularity (e.g., the restart point may correspond to a portion of a file that was currently being backed up when the abort occurred, and thus the restart dump backup may be restarted at a segment of the file not yet transferred to the backup image).

Figure 4A:
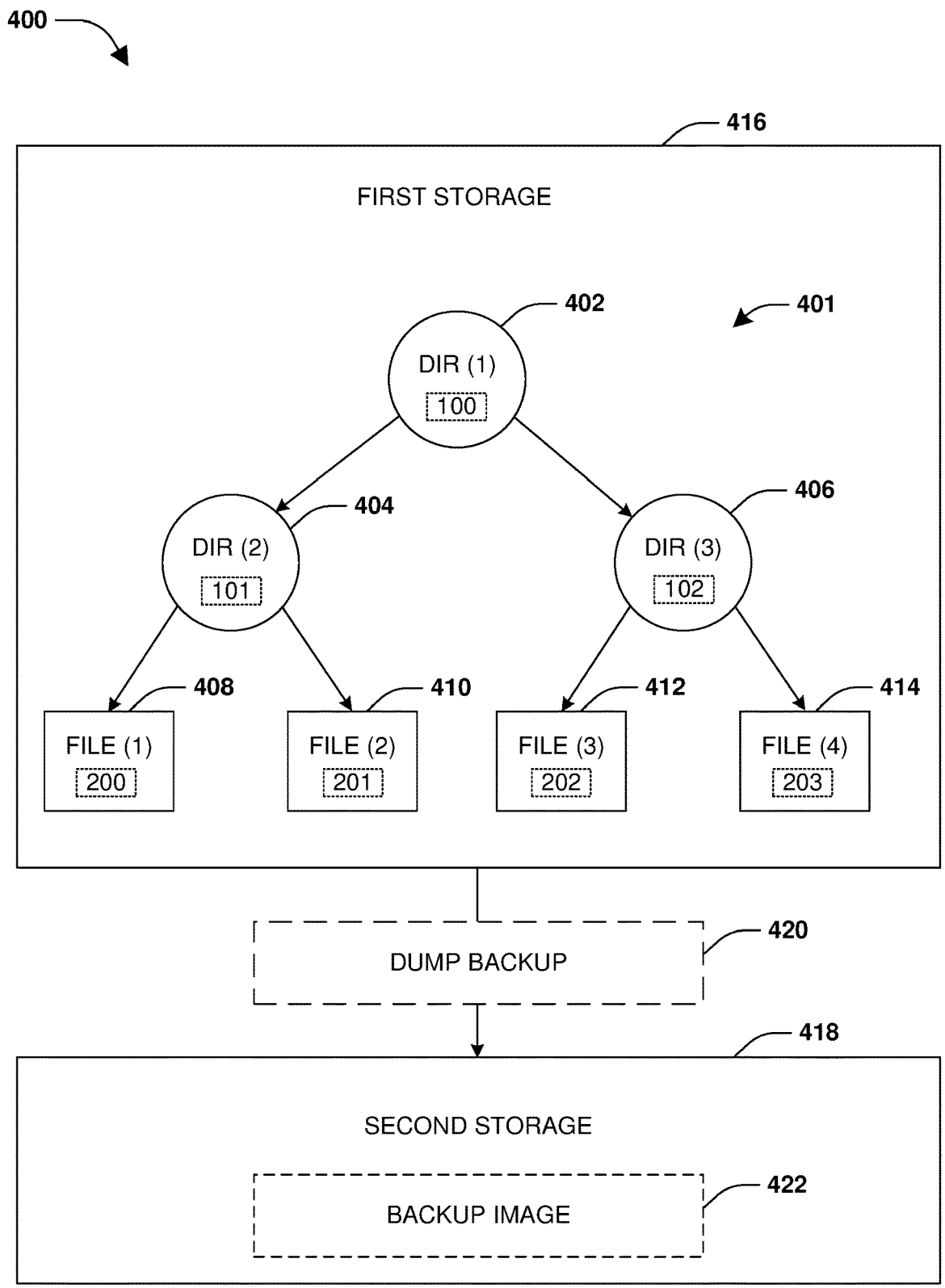
FIG. 4A is a component block diagram illustrating an exemplary computing device for restarting a dump backup.

FIGS. 4A-4D illustrate examples of a system 400 for restarting a dump backup 420. FIG. 4A illustrates first storage 416 comprising data 401. The data 401 may comprise a first directory 402 having a first directory inode of 100, a second directory 404 having a second directory inode of 101, and a third directory 406 having a third directory inode of 102. The second directory 404 may comprise a first file 408 having a first file inode of 200 and a second file 410 having a second file inode of 201. The third directory 406 may comprise a third file 412 having a third file inode of 202 and a fourth file 414 having a fourth file inode of 203. The dump backup 420 may be performed to back up the data 401 from the first storage 416 into a backup image 422 within second storage 418.

Figure 4B:
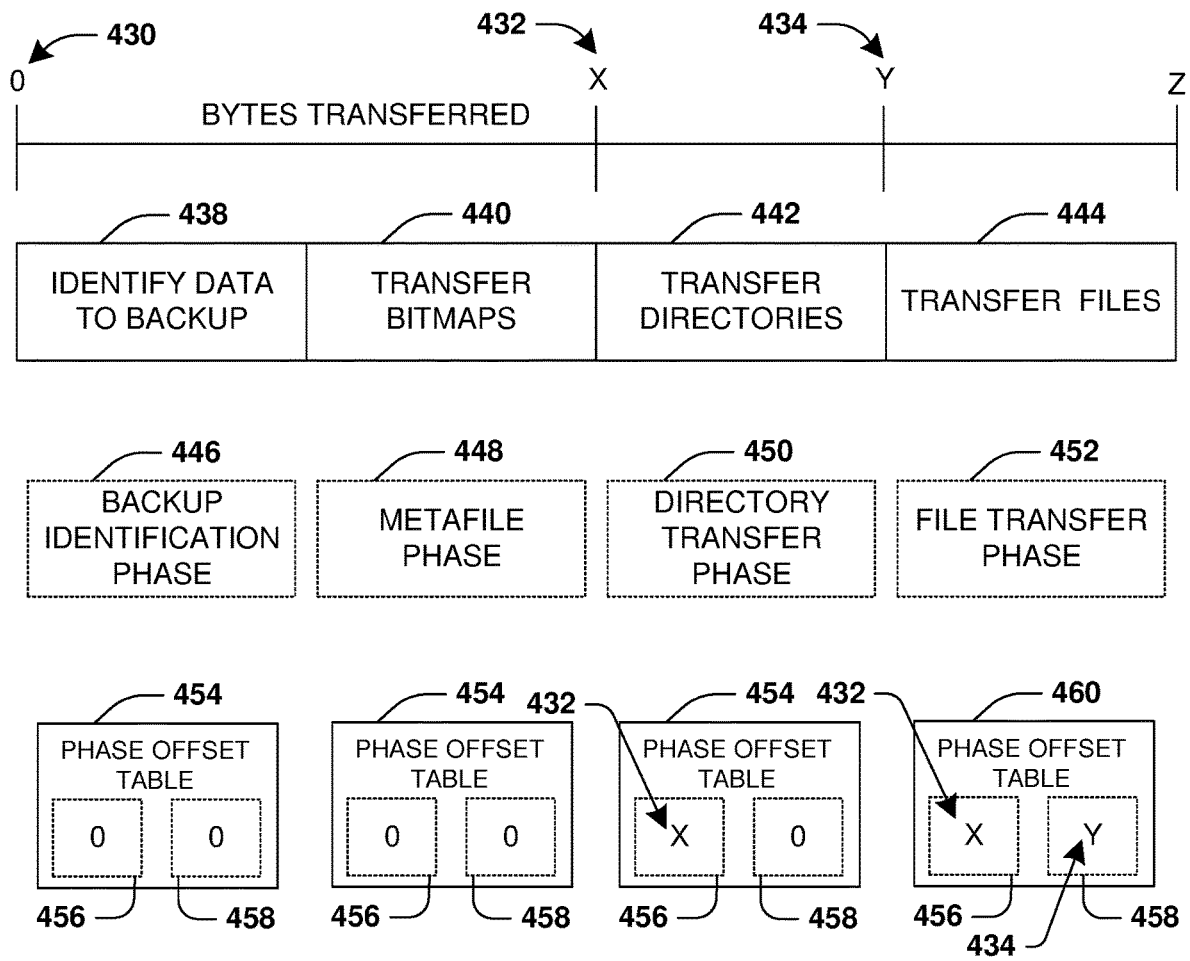
FIG. 4B is a component block diagram illustrating an exemplary computing device for restarting a dump backup, where a phase offset table is maintained.

FIG. 4B illustrates one or more phases of the dump backup 420. The dump backup 420 may comprise a backup identification phase 446 during which the data 401 is identified 438 for being backed up. During the backup identification phase 446, zero bytes 430 have been transferred to the backup image 422. Accordingly, a directory transfer phase offset 456 and a file transfer phase offset 458 of a phase offset table 454 may be set to zero because no directories or files of the data 401 have been transferred, and thus a bytes written value is zero. The dump backup 420 may comprise a metafile phase 448 during which bitmaps may be constructed, locally stored within the first storage 416, and/or transferred 440 to the second storage 418. During the metafile phase 448, at least some bytes of the bitmaps may be transferred 440 to the second storage 418, and thus the bytes written value is greater than zero. Accordingly, the directory transfer phase offset 456 and the file transfer phase offset 458 of the phase offset table 454 may be set to zero because no directories or files of the data 401 have been transferred.

The dump backup 420 may comprise a directory transfer phase 450 during which directories of the data 401 may be transferred 442 into the backup image 422. During the directory transfer phase 450, at least some bytes of the directories may be transferred to the backup image 422, and thus the bytes written value is greater than zero. Accordingly, the directory transfer phase offset 456 may be set to a value (X) 432 corresponding to an offset of a directory inode of a directory transferred 442 to the backup image 422 (e.g., an initial offset within the backup image 422 at which directories are backed up). The file transfer phase offset 458 may be set to zero because no files of the data 401 have been transferred.

The dump backup 420 may comprise a file transfer phase 452 during which files of the data 401 may be transferred 444 into the backup image 422. During the file transfer phase 452, at least some bytes of the files may be transferred to the backup image 422, and thus the bytes written value is greater than zero. Accordingly, the directory transfer phase offset 456 may be set to the value (X) 432 and the file transfer phase offset 458 may be set to a value (Y) 434 corresponding to an offset of a file inode of a file transferred 452 to the backup image 422 (e.g., an initial offset within the backup image 422 at which files are backed up).

Figure 4C:
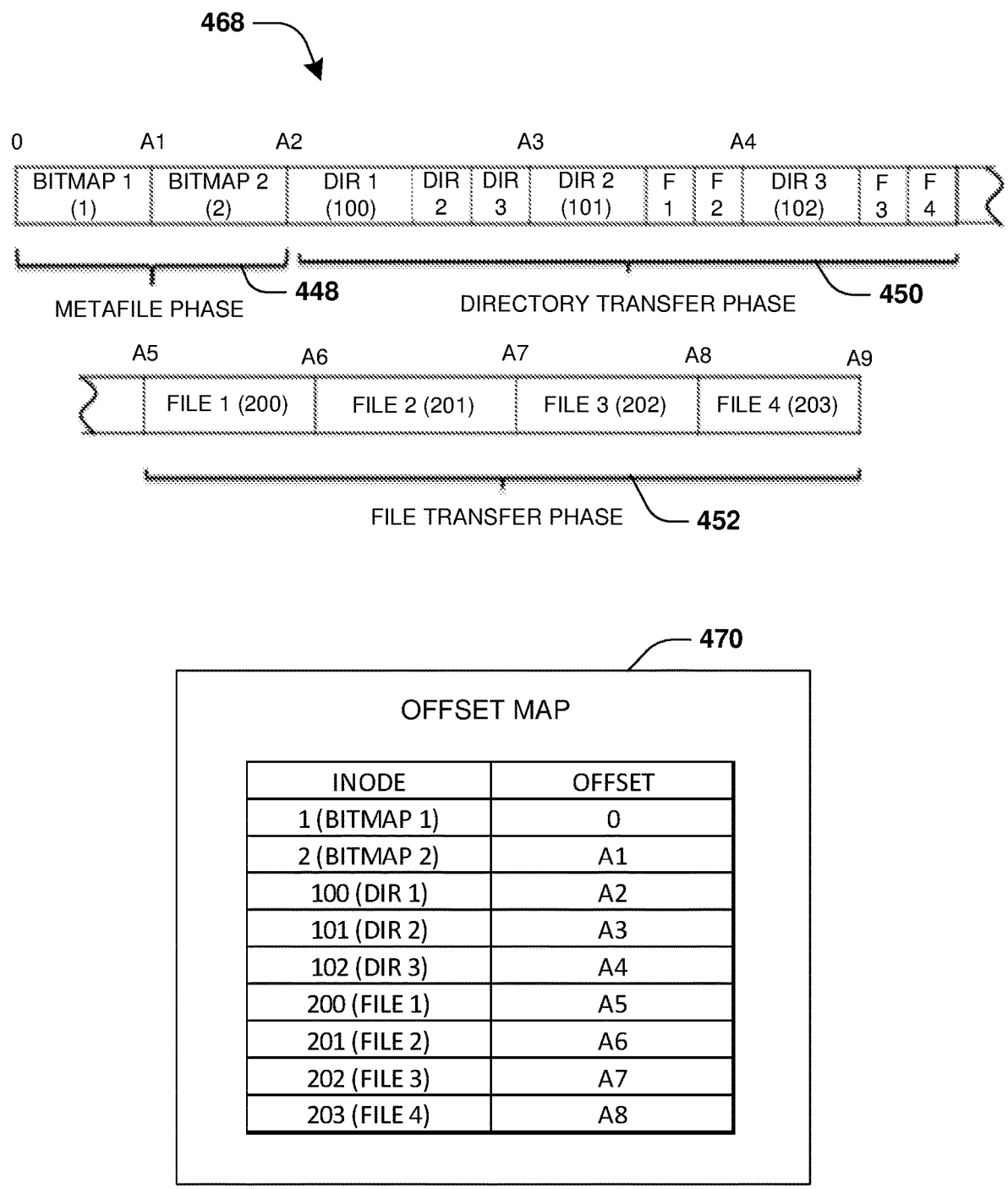
FIG. 4C is a component block diagram illustrating an exemplary computing device for restarting a dump backup, where an offset map is maintained.

FIG. 4C illustrates an example 468 of the backup image 422 during various phases of the dump backup 420. For example, during the metafile phase 448, a first bitmap may be written from a zero offset to an A1 offset within the backup image 422 and a second bitmap may be written from the A1 offset to an A2 offset within the backup image 422. During the directory transfer phase 450, the first directory 402, comprising the second directory 404 and the third directory 406, may be written from the A2 offset to an A3 offset within the backup image 422, the second directory 404, comprising the first file 408 and the second file 410, may be written from the A3 offset to an A4 offset within the backup image 422, and the third directory 406, comprising the third file 412 and the fourth file 414, may be written from the A4 offset to an A5 offset within the backup image 422. During the file transfer phase 452, the first file 408 may be written from the A5 offset to an A6 offset within the backup image 422, the second file 410 may be written from the A6 offset to an A7 offset within the backup image 422, the third file 412 may be written from the A7 offset to an A8 offset within the backup image 422, and the fourth file 414 may be written from the A8 offset to an A9 offset within the backup image 422.

An offset map 470 may be populated with entries that map inodes of the data 401 to offsets of corresponding backup locations for the data 401 within the backup image 422. For example, a first reserved inode of the first bitmap may be mapped to the zero offset and a second reserved inode of the second bitmap may be mapped to the A1 offset. The first directory inode of 100 for the first directory 402 may be mapped to the A2 offset, the second directory inode of 101 for the second directory 404 may be mapped to the A3 offset, and the third directory inode of 102 for the third directory 406 may be mapped to the A4 offset. The first file inode of 200 for the first file 408 may be mapped to the A5 offset, the second file inode of 201 for the second file 410 may be mapped to the A6 offset, the third file inode of 202 for the third file 412 may be mapped to the A7 offset, and the fourth file inode of 203 for the fourth file 414 may be mapped to the A8 offset.

Figure 4D:
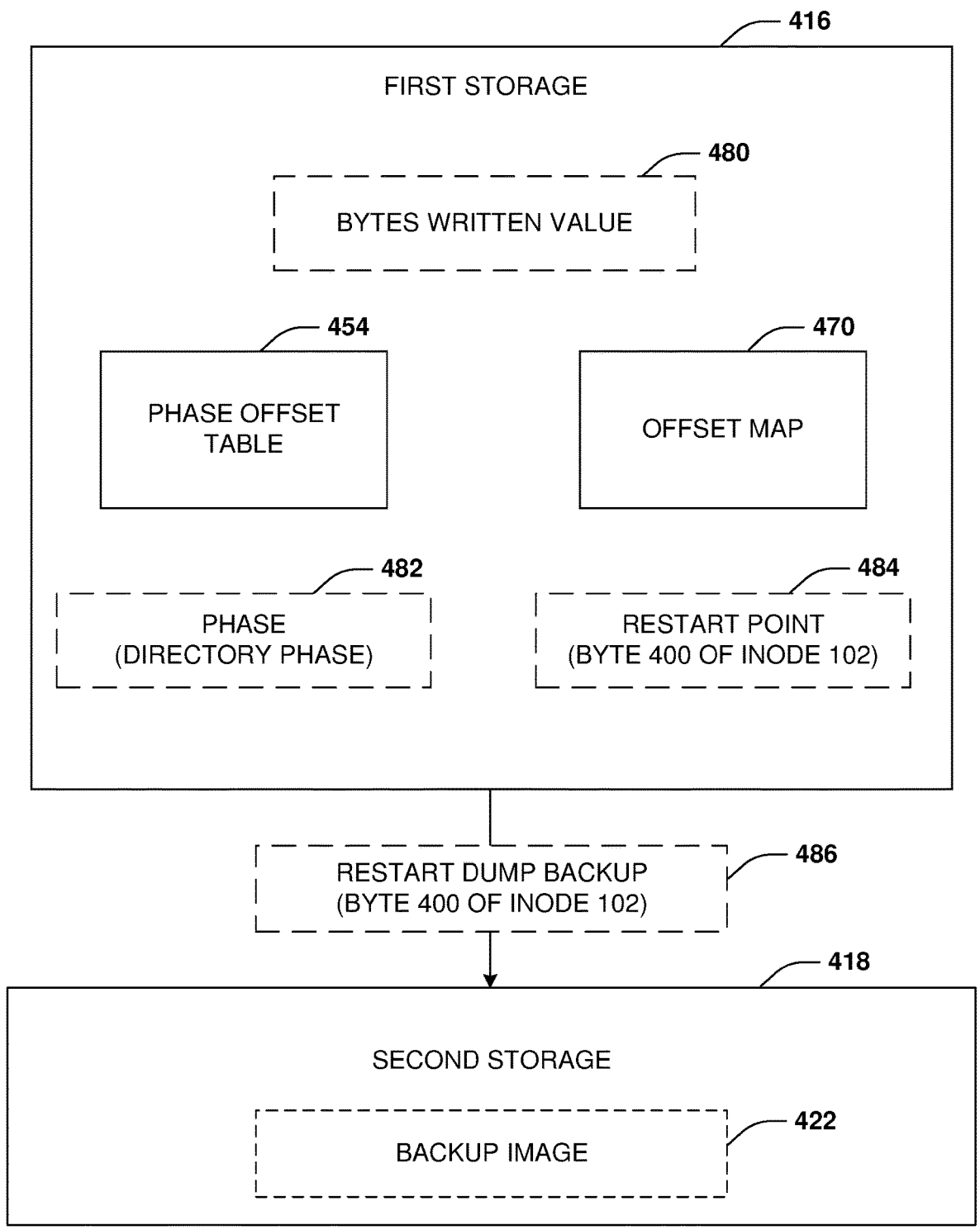
FIG. 4D is a component block diagram illustrating an exemplary computing device for restarting a dump backup, where a restart dump backup is performed at a restart point.

FIG. 4D illustrates the dump backup 420 being restarted after being aborted before completion. The bytes written value 480 may be determined (e.g., provided by a client that originally requested performance of the dump backup 420). The phase offset table 454 may be evaluated using the bytes written value 480 to determine a phase 482 during which the dump backup 420 aborted. For example, the phase 482 may comprise the directory transfer phase 450 because the directory transfer phase offset 456 may be greater than zero and the bytes written value 480 may be less than a value of the file transfer phase offset 458 (e.g., at least some directory data, but no file data, was transferred to the backup image 422).

The offset map 470 may be evaluated using the bytes written value 480 and/or the phase 482 to determine a restart point 484 for restarting the dump backup 420. For example, byte 400 of the third inode of 102 for the third directory 406 may be identified as a subsequent byte of an inode (e.g., the third inode) that is smaller than and closest to the bytes written value 480. Accordingly, a restart dump backup 486 may be performed at the restart point 484 (e.g., restarted at byte 400 of the third inode of 102 for the third directory 406).

Figure 5:
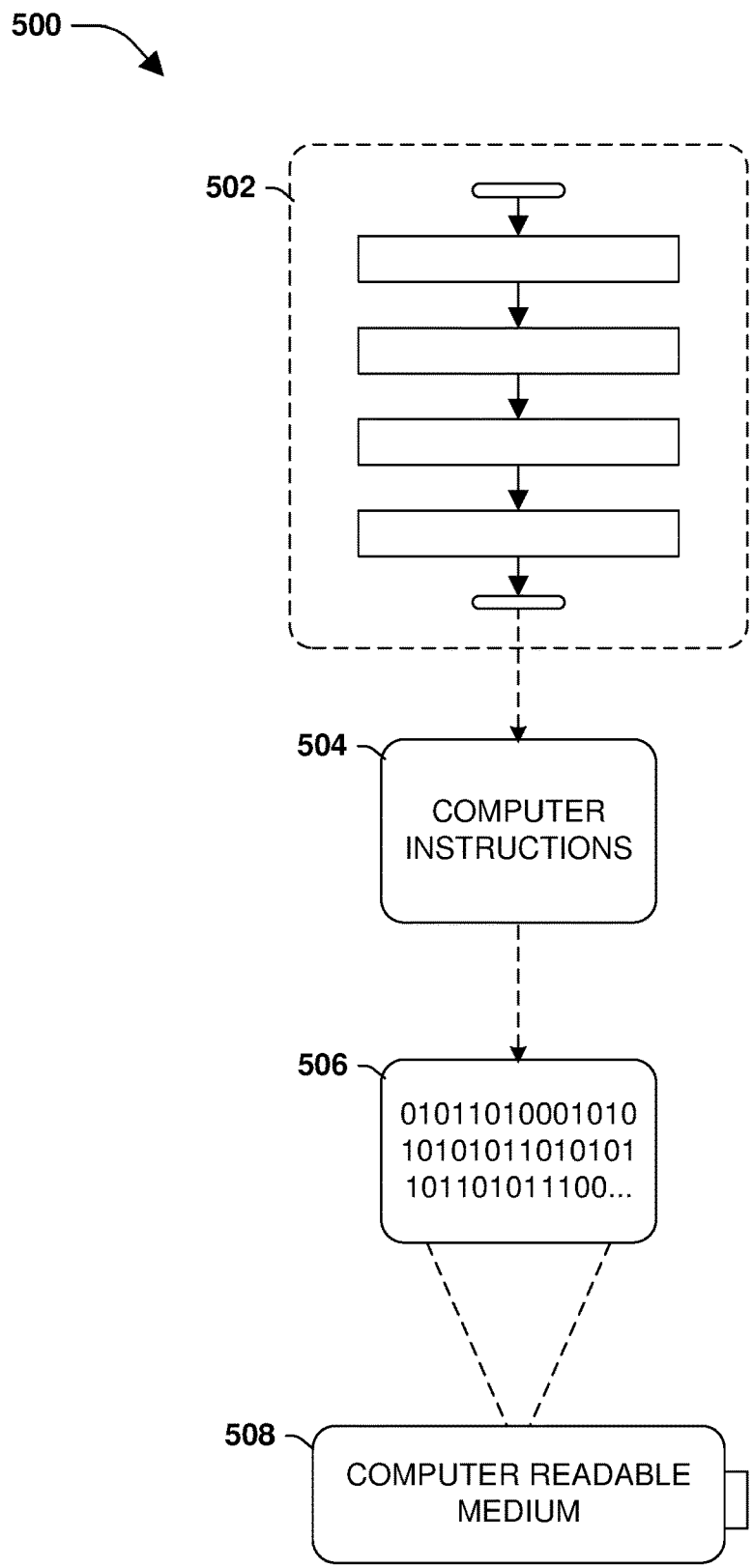
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   determining a bytes written value associated with a prior dump backup of data that aborted before completion;
   comparing the bytes written value to a first value of a directory transfer phase offset, corresponding to a first byte of a last written directory by the prior dump backup, and to a second value of a file transfer phase offset, corresponding to a second byte of a last written file by the prior dump backup, within a phase offset table to identify a phase during which the abort occurred, wherein the comparing comprises:
      identifying the phase out of a set of phases of the prior dump backup based upon a comparison of the bytes written value, the first value of the directory transfer phase offset, and the second value of the file transfer phase offset;
   evaluating, using the bytes written value and the phase, an offset map, comprising entries mapping inodes of the data to offsets within a backup image associated with the prior dump backup, to determine a restart point comprising a byte number of an inode corresponding to a subsequent byte to a difference between the bytes written value and an offset of the inode; and
   performing a restart dump backup, of the prior dump backup, at the byte number of the inode specified by the restart point.

2. The method of claim 1, wherein the identifying comprises:
   identifying the phase out of a backup identification phase, a metafile phase, the directory transfer phase, and the file transfer phase of the set of phases.

3. The method of claim 1, wherein the identifying comprises:
   determining that the prior dump backup aborted in a metafile phase based upon the bytes written value being greater than zero and the first value of the directory transfer phase offset having a zero value.

4. The method of claim 1, wherein the identifying comprises:
   determining that the prior dump backup aborted in a directory transfer phase based upon the first value of the directory transfer phase offset being greater than zero and the bytes written value being less than the second value of the file transfer phase offset.

5. The method of claim 1, wherein the identifying comprises:
   determining that the prior dump backup aborted in a file transfer phase based upon the bytes written value being greater than the second value of the file transfer phase offset.

6. The method of claim 1, wherein the evaluating an offset map comprises:
   determining the restart point as a beginning point based upon the prior dump backup aborting within a backup identification phase.

7. The method of claim 1, wherein the evaluating an offset map comprises:
   querying the offsets within the offset map using the bytes written value to identify the inode as the restart point based upon the inode having a value that is smaller than and closest to the bytes written value.

8. The method of claim 1, wherein the prior dump back is backing up data from first storage to second storage.

9. The method of claim 1, wherein the prior dump backup has a file history creation option turned off.

10. The method of claim 1, wherein the prior dump back is backing up data from first storage to second storage, and wherein the first storage is hosted by a first computing device and the second storage is hosted by a distributed storage environment.

11. The method of claim 1, wherein the prior dump back is backing up data from first storage to second storage, and wherein the first storage is hosted by a first computing device and the second storage comprises a tape backup device.

12. The method of claim 1, comprising:
   updating the first value of the directory transfer phase offset based upon the prior dump backup writing a byte of a directory.

13. The method of claim 1, comprising:
updating the second value of the file phase offset based upon the prior dump backup writing a byte of a file.

14. The method of claim 1, comprising:
populating the offset map with a first entry mapping a first bitmap to a zero offset and a second entry mapping a second bitmap to a first offset, the first bitmap having a first reserved inode number and the second bitmap having a second reserved inode number, wherein the first bitmap and the second bitmap are computed during a backup identification phase.

15. The method of claim 14, wherein the prior dump back is backing up data from first storage to second storage, and the method comprising:
writing the first bitmap and the second bitmap to the second storage.

16. The method of claim 1, wherein the prior dump back is backing up data from first storage to second storage, and wherein the offset map comprises an entry mapping a file inode of a file, comprised within the data of the first storage, to an offset of a backup location for the file within the backup image of the second storage.

17. The method of claim 1, wherein the prior dump back is backing up data from first storage to second storage, and wherein the offset map comprises an entry mapping a directory inode of a directory, comprised within the data of the first storage, to an offset of a backup location for the directory within the backup image of the second storage.

18. A non-transitory machine readable medium having stored thereon instructions, which when executed a machine, causes the machine to:
determine a bytes written value associated with a prior dump backup of data that aborted before completion;
compare the bytes written value to a first value of a directory transfer phase offset, corresponding to a first byte of a last written directory by the prior dump backup, and to a second value of a file transfer phase offset, corresponding to a second byte of a last written file by the prior dump backup, within a phase offset table to identify a phase during which the abort occurred, comprising:
identifying the phase out of a set of phases of the prior dump backup based upon a comparison of the bytes written value, the first value of the directory transfer phase offset, and the second value of the file transfer phase offset;
evaluate, using the bytes written value and the phase, an offset map, comprising entries mapping inodes of the data to offsets within a backup image associated with the prior dump backup, to determine a restart point comprising a byte number of an inode corresponding to a subsequent byte to a difference between the bytes written value and an offset of the inode; and
perform a restart dump backup, of the prior dump backup, at the byte number of the inode specified by the restart point.

19. A computing device comprising:
a memory comprising machine executable code having stored thereon instructions for performing a method; and
a processor coupled to the memory, the processor configured to execute the machine executable code to cause the processor to:
determine a bytes written value associated with a prior dump backup of data that aborted before completion;
compare the bytes written value to a first value of a directory transfer phase offset, corresponding to a first byte of a last written directory by the prior dump backup, and to a second value of a file transfer phase offset, corresponding to a second byte of a last written file by the prior dump backup, within a phase offset table to identify a phase during which the abort occurred, comprising:
identifying the phase out of a set of phases of the prior dump backup based upon a comparison of the bytes written value, the first value of the directory transfer phase offset, and the second value of the file transfer phase offset;
evaluate, using the bytes written value and the phase, an offset map, comprising entries mapping inodes of the data to offsets within a backup image associated with the prior dump backup, to determine a restart point comprising a byte number of an inode corresponding to a subsequent byte to a difference between the bytes written value and an offset of the inode; and
perform a restart dump backup, of the prior dump backup, at the byte number of the inode specified by the restart point.

20. The computing device of claim 19, wherein the machine executable code causes the processor to:
determine that the prior dump backup aborted in a metafile phase based upon the bytes written value being greater than zero and the first value of the directory transfer phase offset having a zero value.

* * * * *